(12) United States Patent
Thoppai et al.

(10) Patent No.: US 10,530,855 B2
(45) Date of Patent: Jan. 7, 2020

(54) LOCK STATE SYNCHRONIZATION FOR NON-DISRUPTIVE PERSISTENT OPERATION

(71) Applicant: NetApp, Inc., Sunnyvale, CA (US)

(72) Inventors: Omprakaash C. Thoppai, Seven Fields, PA (US); William Zumach, Pittsburgh, PA (US); Wangyuan Zhang, Pittsburgh, PA (US); Vinay Sridhar, Seven Fields, PA (US); Robert Wyckoff Hyer, Jr., Seven Fields, PA (US)

(73) Assignee: NETAPP, INC., Sunnyvale, CA (US)

( * ) Notice: Subject to any disclaimer, the term of this patent is extended or adjusted under 35 U.S.C. 154(b) by 142 days.

(21) Appl. No.: 15/054,376

(22) Filed: Feb. 26, 2016

(65) Prior Publication Data

US 2016/0182630 A1    Jun. 23, 2016

Related U.S. Application Data

(63) Continuation of application No. 13/666,805, filed on Nov. 1, 2012, now Pat. No. 9,280,396.

(51) Int. Cl.
| | |
|---|---|
| *H04L 29/08* | (2006.01) |
| *G06F 16/27* | (2019.01) |
| *G06F 16/176* | (2019.01) |
| *G06F 16/23* | (2019.01) |
| *G06F 9/52* | (2006.01) |

(52) U.S. Cl.
CPC ........... *H04L 67/1095* (2013.01); *G06F 9/52* (2013.01); *G06F 16/1774* (2019.01); *G06F 16/2336* (2019.01); *G06F 16/2343* (2019.01); *G06F 16/27* (2019.01); *G06F 16/273* (2019.01); *H04L 67/1097* (2013.01)

(58) Field of Classification Search
CPC ......... G06F 17/30171; G06F 17/30362; G06F 17/30578
USPC .................................................. 709/224–225
See application file for complete search history.

(56) References Cited

U.S. PATENT DOCUMENTS

| | | | |
|---|---|---|---|
| 5,226,159 A | 7/1993 | Henson et al. | |
| 6,105,099 A * | 8/2000 | Freitas | G06F 9/52 |
| | | | 370/231 |

(Continued)

*Primary Examiner* — William G Trost, IV
*Assistant Examiner* — Imran Moorad
(74) *Attorney, Agent, or Firm* — Klein, O'Neill & Singh, LLP

(57) ABSTRACT

Techniques for synchronization between data structures for original locks and mirror lock data structures are disclosed herein. The mirror lock data structures are being maintained during various scenarios including volume move and aggregate relocation, in order to preserve the non-disruptive persistent operation on storage initiated by clients. According to one embodiment, a storage node determines a plurality of data container locks to be synchronized to a partner node of the storage node and transfers metadata that indicates states of variables that represent the plurality of data container locks to the partner node in a batch. When a client initiates a data access operation that causes an attempt to modify a data container lock of the plurality of data container locks, the storage node sends a retry code to a client that prompts the client to retry the data access operation after a predetermined time period.

20 Claims, 11 Drawing Sheets

(56) References Cited

U.S. PATENT DOCUMENTS

| | | | | |
|---|---|---|---|---|
| 6,304,938 B1* | 10/2001 | Srivastava | ............. | G06F 9/524 |
| | | | | 710/200 |
| 7,143,097 B1* | 11/2006 | Olker | ............... | G06F 17/30171 |
| 7,356,531 B1 | 4/2008 | Popelka et al. | | |
| 7,587,558 B1 | 9/2009 | Smith et al. | | |
| 7,640,582 B2 | 12/2009 | Beck | | |
| 7,844,584 B1* | 11/2010 | Griess | ................ | G06F 16/1774 |
| | | | | 707/704 |
| 8,296,599 B1* | 10/2012 | Boyer | ................... | G06F 11/203 |
| | | | | 714/4.11 |
| 8,429,753 B2 | 4/2013 | Skaria et al. | | |
| 8,533,171 B2* | 9/2013 | Patwardhan | ...... | G06F 17/30171 |
| | | | | 707/704 |
| 8,799,216 B1* | 8/2014 | McCline | ............ | G06F 16/2365 |
| | | | | 707/610 |
| 2002/0194429 A1 | 12/2002 | Chiu et al. | | |
| 2007/0150665 A1* | 6/2007 | Arimilli | .................. | G06F 9/526 |
| | | | | 711/145 |
| 2007/0271562 A1* | 11/2007 | Schumacher | ............ | G06F 8/10 |
| | | | | 718/100 |
| 2010/0017409 A1 | 1/2010 | Rawat et al. | | |
| 2011/0137879 A1* | 6/2011 | Dubey | ............... | G06F 16/1774 |
| | | | | 707/704 |
| 2012/0259820 A1* | 10/2012 | Patwardhan | ........ | G06F 16/1774 |
| | | | | 707/674 |
| 2013/0346724 A1 | 12/2013 | Ranade et al. | | |
| 2015/0370827 A1* | 12/2015 | Parkison | ............ | G06F 16/1844 |
| | | | | 707/626 |

* cited by examiner

LOCK STATE SYNCHRONIZATION FOR NON-DISRUPTIVE PERSISTENT OPERATION

CROSS-REFERENCE TO RELATED APPLICATION

This patent application claims priority of and is a continuation of U.S. patent application Ser. No. 13/666,805 filed on Nov. 1, 2012, and now U.S. Pat. No. 9,280,396, the disclosure of which is incorporated herein by reference in its entirety.

FIELD OF THE INVENTION

At least one embodiment of the present invention pertains to network storage systems, and more particularly, to a network storage system providing a data container locking mechanism.

BACKGROUND

A storage system typically comprises one or more storage devices where information can be stored and from where information can be retrieved. A network storage system can be implemented in accordance with any of a variety of storage architectures and techniques including, but not limited to, a network-attached storage (NAS) environment or a storage area network (SAN).

A storage system typically includes a storage operating system that implements a high-level data organization module, such as a file system, to logically organize stored data in hierarchical structures of logical containers. The logical containers can be or include, for example, volumes, files and/or logical units. A volume is a logical data set which is an abstraction of physical storage, combining one or more physical mass storage devices (e.g., disks) or parts thereof into a single logical storage object. Volumes can be further organized into aggregates. An aggregate is a logical container for a pool of storage, combining one or more physical mass storage devices (e.g., disks) or parts thereof into a single logical storage object, which contains or provides storage for one or more other logical data sets at a higher level of abstraction (e.g., volumes). Each logical container can be configured to store data in smaller units, often called blocks. Each block contains information, which may include the actual data of the file and/or metadata. The blocks of one or more files can be organized within one or more volumes that are maintained by the file system.

A network storage system can be configured to operate according to a client-server model of information delivery, to allow clients to store and access data in the system via a network. In this model, the client can have an application, such as a database application, executing in a computer that communicates with the storage system. Each client may send input/output (I/O) requests to read and write the data containers.

Two or more storage systems may be interconnected as a storage cluster to service client requests. The clustered storage systems can provide redundancy for the data stored in the systems, so that if one storage system becomes unavailable, then another storage system in the cluster takes over the storage space managed by the unavailable system to provide uninterrupted data service to the client. For example, a high-availability (HA) cluster can harness storage servers (also referred to as nodes) in pairs, groups or clusters to provide continued service when one or more of the system components fail. An HA cluster can detect hardware or software faults in one of its nodes and immediately cause another node to take over the service from the at-fault node without requiring administrative intervention; this is a process known as failover.

In such an environment, managing access rights associated with I/O operations is a challenge. Access rights may be managed by issuing locks to one or more client applications (which can be referred to individually as "a client"), on a data container or a set of data residing at a storage volume. A lock provides certain rights to the entity (e.g. a client) which owns the lock, to perform read and write operations with respect to the data or the data container. The lock prevents the interceding update scenario in which more than one entity attempts to access the same data simultaneously. Continuous efforts are being made to better manage locks in networked storage systems without interrupting clients' data requests.

For example, computer nodes within a networked storage cluster can store information of the locks in a shared memory that multiple computer nodes can access. When a first node fails, a second node can take over storage of the first node and retrieve information of the locks for the storage from the shared memory. Thus the second node can continue to service data requests for the taken-over storage and maintain access rights of the taken-over storage controlled by the locks. However, shared memory architectures are costly and require special hardware to implement.

SUMMARY

Techniques introduced here provide synchronization mechanisms between original lock data structures and provide mirrored lock data structures maintained in separate cluster nodes. The mirrored lock data structures are maintained and synchronized with the original lock data structures in various scenarios including volume move and aggregate relocation operations, to preserve the non-disruptive persistent storage access operations initiated by clients. The mirrored lock data structures enable a cluster node to take over data storage from another (failing) node and maintain the locks for the data storage without data service disruption to the client.

In accordance with the techniques introduced here, therefore, a method for synchronizing lock data structures is provided. The method comprises: determining, at a storage node, a plurality of data container locks to be synchronized to a partner node of the storage node; and transferring metadata that indicates states of variables that represent the plurality of data container locks to the partner node in a batch. When a client initiates a data access operation that causes an attempt to modify a data container lock of the plurality of data container locks, the storage node sends a retry code to a client that prompts the client to retry the data access operation after a predetermined time period. Also disclosed are an apparatus and system for performing such a method.

When a node becomes unavailable and another partner node takes over for it, client access to data containers and locks is maintained because the partner node can construct the locks that were issued by the node that became unavailable. With the mirrored lock data structure being kept in a partner node, the partner node recovers the locks from the mirrored lock data structure when a takeover occurs. In this way, the client's data access rights based on the locks are kept non-disruptively. For this non-disruptive operation (NDO) capability for locks, mirrored lock data structures on the partner node are kept in sync with original locks on the other node all the time, including the time periods during which the controls of data storage or aggregates are being transferred between nodes.

Other aspects of the technology introduced here will be apparent from the accompanying figures and from the detailed description which follows.

BRIEF DESCRIPTION OF THE DRAWINGS

These and other objects, features and characteristics of the present invention will become more apparent to those skilled in the art from a study of the following detailed description in conjunction with the appended claims and drawings, all of which form a part of this specification. In the drawings:

DETAILED DESCRIPTION

References in this specification to "an embodiment," "one embodiment," or the like, mean that the particular feature, structure, or characteristic being described is included in at least one embodiment of the present invention. Occurrences of such phrases in this specification do not all necessarily refer to the same embodiment, however.

Mechanisms for synchronization between data structures for original locks and mirrored lock data structures are disclosed herein. To preserve the non-disruptive data access operations on storage initiated by clients, the mirrored lock data structures are made to be synchronous with the original lock data structures. The following paragraphs describe a general architecture and operation of a storage cluster system in which the lock synchronization techniques can be implemented.

Figure 1:
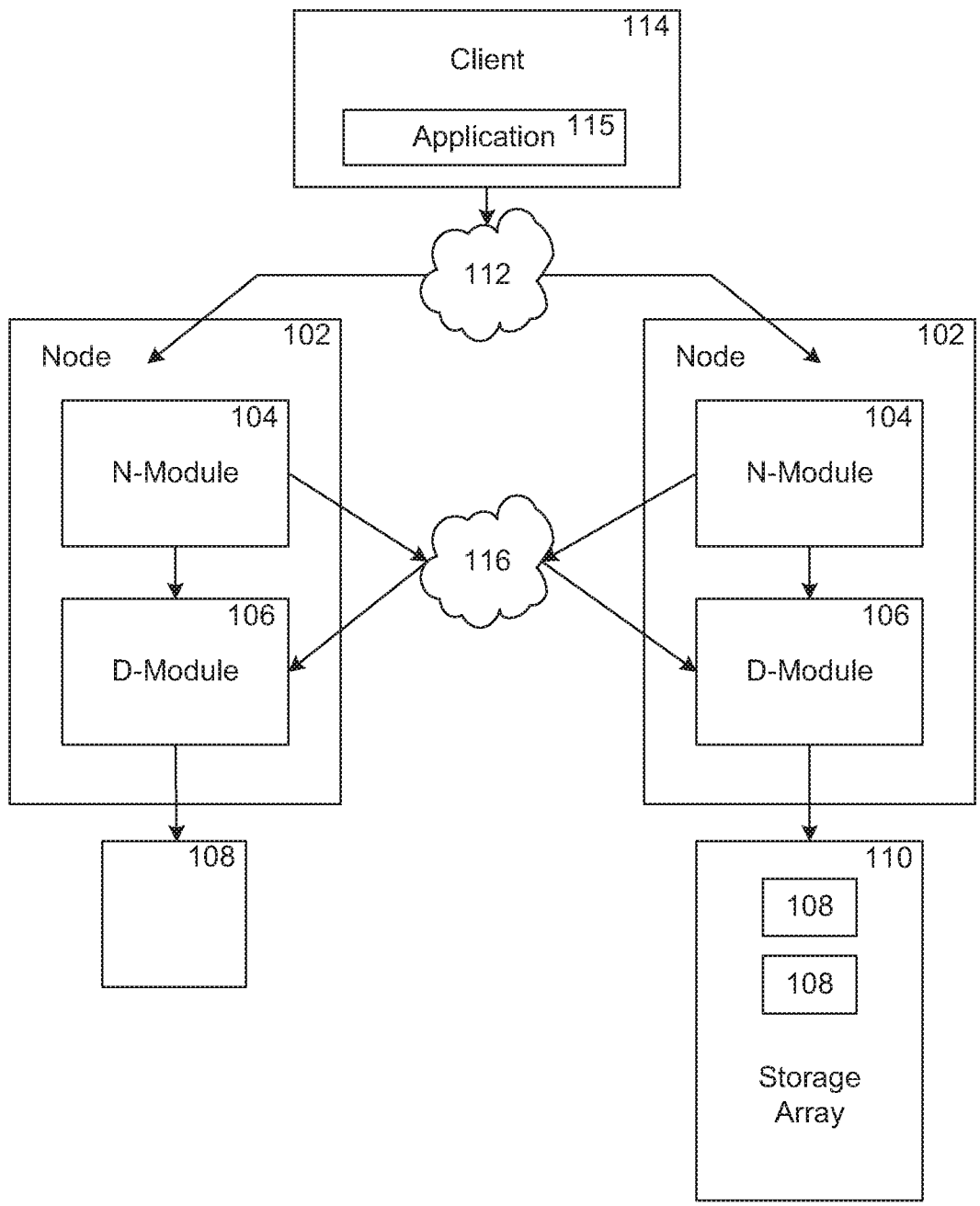
FIG. 1 is a schematic block diagram showing a plurality of storage system nodes interconnected as a storage cluster for servicing data requests.

FIG. 1 is a schematic block diagram showing multiple storage system nodes 102 interconnected as a storage cluster 100. The storage system nodes 102 are configured to provide storage services for one or more clients 114 in relation to data organized at storage devices managed by the nodes 102. At least one client computing system (which may be referred to as "a client") 114 interfaces with one or more of the nodes 102 for reading or writing data stored at the storage devices.

Nodes 102 can include various components that cooperate to provide distributed storage system architecture of cluster 100. In one embodiment, each node 102 includes a network element (N-module 104) and a storage device element (D-module 106). Each N-module 104 includes functionality that enables node 102 to connect to client computing systems 114 over a network connection 112, while each D-module 106 connects to one or more storage devices, such as a storage device 108 or a storage array 110. Illustratively, network 112 can be embodied as an Ethernet network, a Fibre Channel (FC) network or any other network type. Nodes 102 can be interconnected by a cluster switching fabric 116 which may be embodied as a Gigabit Ethernet switch, for example.

FIG. 1 shows an equal number of N-modules and D-modules in the cluster 100; however, a cluster can include different numbers of N-modules and D-modules. For example, there may be numbers of N-modules and D-modules interconnected in a cluster that do not reflect a one-to-one correspondence between the N-modules and D-modules.

Each client 114 can be, for example, a general purpose computer having components that may include a central processing unit (CPU), main memory, I/O devices, and storage devices (for example, flash memory, hard drives and others). The main memory may be coupled to the CPU via a system bus or a local memory bus. The main memory may be used to provide the CPU access to data and/or program information that is stored in main memory at execution time. Typically, the main memory is composed of random access memory (RAM) circuits. A computer system with the CPU and main memory is often referred to as a host system.

Clients 114 can be configured to interact with a node 102 in accordance with a client/server model of information delivery. For example, each client 114 can request the services of a node 102 (e.g., read or write services), and the node 102 can return the results of the services requested by the client 114 over network 112.

Clients 114 can be configured to execute software and/or firmware instructions (hereinafter collectively called "software"), shown as application 115 for reading and writing data stored in storage devices 108. Application 115 can be, for example, a database application, a financial management system, an electronic mail application or any other application type.

Client 114 can issue packets using application 115 according to file-based access protocols, such as the Common Internet File System ("CIFS") protocol or the Network File System ("NFS") protocol, over the Transmission Control Protocol/Internet Protocol ("TCP/IP") when accessing data in the form of certain data containers, such as files. Alternatively, the client 114 can issue packets using application 115 including block-based access protocols, such as the Small Computer Systems Interface ("SCSI") protocol encapsulated over TCP ("iSCSI") and SCSI encapsulated over Fibre Channel ("FCP"), when accessing data in the form of other data containers, such as blocks.

Figure 2:
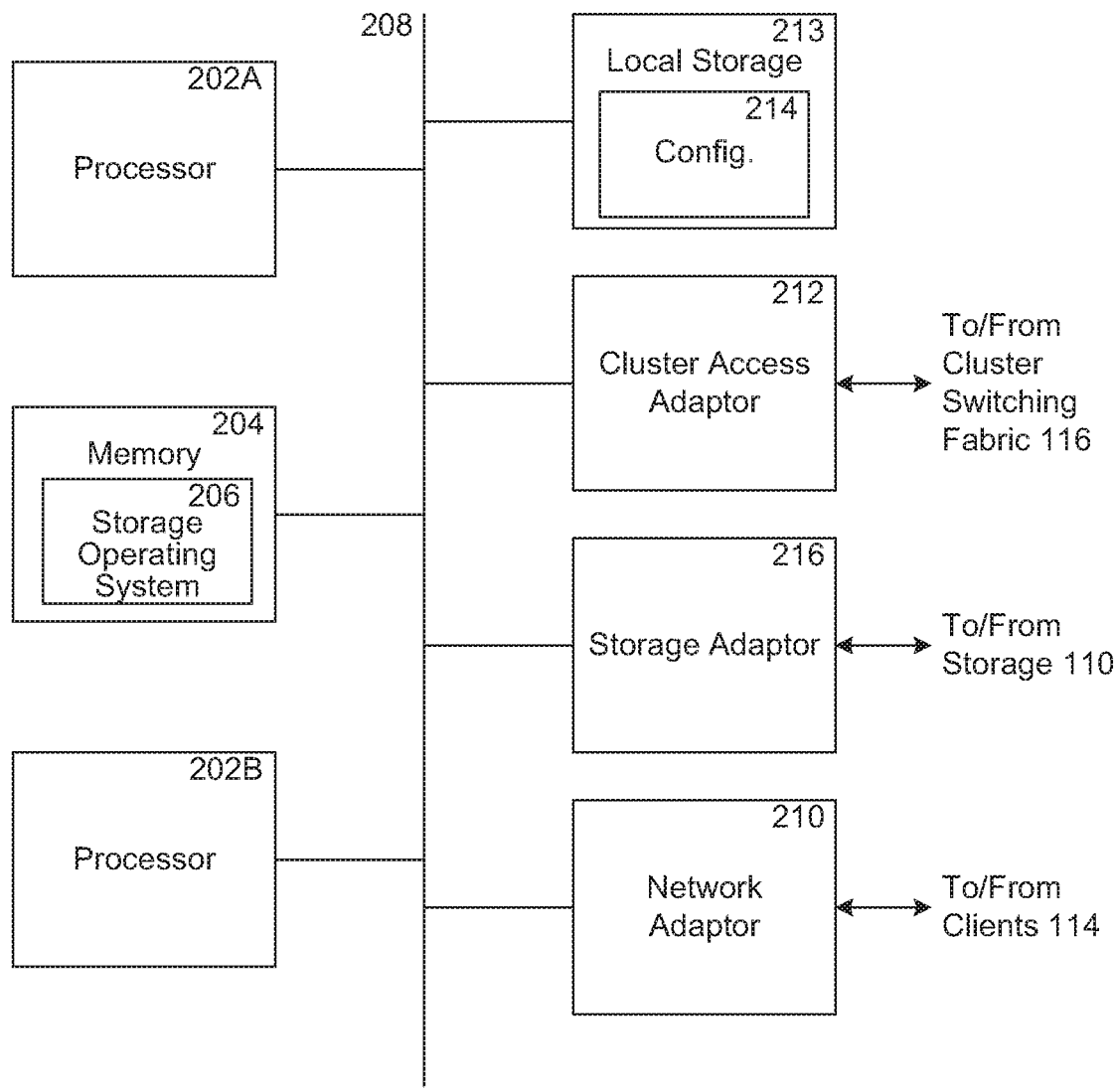
FIG. 2 is a high-level block diagram showing an example of the architecture of a node, which can represent any of the high-availability cluster nodes.

FIG. 2 is a block diagram of one embodiment of a node 102, that includes multiple processors 202A and 202B, a memory 204, a network adapter 210, a cluster access adapter 212, a storage adapter 216 and local storage 213 interconnected by an interconnect system (also referred to as bus) 208. The local storage 213 comprises one or more physical storage devices, such as disks, non-volatile storage devices, flash drives, video tape, optical, DVD, magnetic tape, electronic random access memory, micro-electro mechanical and any other similar media adapted to store information. The local storage 213 can also be utilized by the node to locally store configuration information (e.g., in a configuration data structure 214).

Processors 202A/202B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices. In other embodiments, a node can include a single processor, instead of multiple processors. The bus system 208 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The cluster access adapter 212 can comprise one or more ports adapted to couple node 102 to other nodes of cluster 100. In the illustrative embodiment, Ethernet may be used as the clustering protocol and interconnect media, although it will be apparent to those skilled in the art that other types of protocols and interconnects may be utilized within the cluster architecture described herein. In alternate embodiments, where the N-modules and D-modules are implemented on separate storage systems or computers, the cluster access adapter 212 is utilized by the N-module or D-module for communicating with other N-module and/or D-modules in the cluster 100.

The network adapter 210 can further comprise one or more ports adapted to couple the node 102 to one or more clients 114 over point-to-point links, wide area networks, virtual private networks implemented over a public network (e.g. Internet) or a shared local area network. The network adapter 210 thus can comprise the mechanical, electrical and signaling circuitry needed to connect the node to the network.

The storage adapter 216 cooperates with a storage operating system 206 executing on the node 102 to access data requested by the clients. The data can be stored on any type of attached storage device media such as video tape, optical, DVD, magnetic tape, bubble memory, electronic random access memory, micro-electro mechanical and any other similar media adapted to store information, including data and parity information. For example, as illustrated in FIG. 1, the data can be stored in the storage devices 108 of array 110, which may be a redundant array of inexpensive devices (RAID) array, for example. The storage adapter 216 can include a plurality of ports having input/output (I/O) interface circuitry that couples to the storage devices over an I/O interconnect arrangement, such as a conventional high-performance, Fibre Channel (FC) link topology.

Although various adapters (210, 212 and 216) have been shown as separate hardware based components, the embodiments disclosed herein are not limited to those elements being separate components. For example, the embodiments disclosed herein may be implemented using a converged network adapter (CAN) that is capable of handling both network and storage protocols, for example, a Fibre Channel over Ethernet (FCoE) adapter.

Each node 102 is illustratively embodied as a multiple-processor system executing the storage operating system 206. The operating system 206 can run on the processors as a high-level data organization module, that includes a file system to logically organize the data as a hierarchical structure of volumes, directories, files (possibly including special types of files called virtual disks), and data blocks (hereinafter generally "blocks") on storage devices 108. However, it will be apparent to those of ordinary skill in the art that the node 102 can alternatively comprise a single processor or more than two processors. In one embodiment, one processor 202A executes the functions of the N-module 104 on the node, while the other processor 202B executes the functions of the D-module 106.

The memory 204 can record storage locations that are addressable by the processors and adapters for storing programmable instructions and data structures. The processor and adapters can, in turn, include processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

An example of operating system 206 is the DATA ONTAP® (Registered trademark of NetApp, Inc.) operating system available from NetApp, Inc. which may implement the Write Anywhere File Layout (WAFL® (Registered trademark of NetApp, Inc.)) file system. However, any appropriate storage operating system can be enhanced for use in accordance with the inventive principles described herein.

Storage of data on each storage array 110 is preferably implemented as one or more storage "volumes" that comprise a collection of physical storage devices 108 cooperating to define an overall logical arrangement of volume block number (VBN) space on the volume(s). Each logical volume is generally, although not necessarily, associated with its own file system. The storage devices 108 within a logical volume/file system are typically organized as one or more groups, wherein each group may be operated as a RAID group.

Each node maintains a lock data structure for managing locks that are granted to client 114 for accessing a piece of data or a data container managed by a node. A lock as used herein means a mechanism used by node 102 to limit access to a data container (e.g. a file or a data block). There are various "rights" associated with the locks that can be issued or revoked with respect to a data container. The term "rights" as used herein means a privilege that is granted to an entity, such as a client application executed at a computing device, with respect to any input/output (I/O) operation, including read and write operations. The term "data container" as used throughout this specification means a file, a logical unit, a data block or any other unit for organizing data.

The storage operating system 206, at least a portion of which is typically resident in the memory of the node 102 invokes storage operations in support of the storage service implemented by the node 102, and maintains a lock data structure for managing various lock types that are issued to client applications. The lock data structure may include various metadata fields that can be used to reconstruct a lock. The various lock types are utilized in responding to client 114 requests for reading, writing, or modifying a data container. The following provides a brief description of the various lock types that may be used by storage operating system 206 for managing access to data containers.

In one embodiment the following types of locks may be used by the system: Opportunistic Lock, Shared Lock, Byte Lock and Persistent Open.

An "Opportunistic Lock" ("OpLock") is a lock that is placed by one or more clients on a data container residing in a storage volume. States of variables that represent an OpLock can be embedded in a data container attribute (e.g., metadata) for the data container. OpLock, based on client requests, coordinates data caching and coherency between clients and storage systems. Coherency or coherent data in this context means that all instances of any item of data are the same across a network, i.e. data stored by the storage system and locally by the clients is synchronized. OpLocks are defined by the CIFS protocol and there are different types of OpLocks, for example, Level 1, Level 2 and other types. The rights associated with an OpLock depend on the OpLock type.

A "Shared Lock" is typically granted to a client application (115) by storage operating system 206. The shared lock allows more than one application 115 to access a data container.

"Byte lock" is a lock type that limits access to a portion of a data container. A client can request to open a data container and request a lock for a byte range of the data container.

"Persistent Open" is a feature that may be used for various locks issued by storage operating system 206. The persistent open feature provides an exclusive right of a data container. When a node 102 grants a persistent open lock of a data container to a client, it also provides a reconnect key to the client. If the node becomes unavailable for any reason, the persistent open lock stays open for a duration "t" and within that duration, the client may use the reconnect key to obtain the lock and access to the data container.

To manage the various locks, the storage operating system includes a lock manager that maintains one or more lock data structures for managing the locks. Details regarding the lock manager and the lock data structures are provided below.

Figure 3:
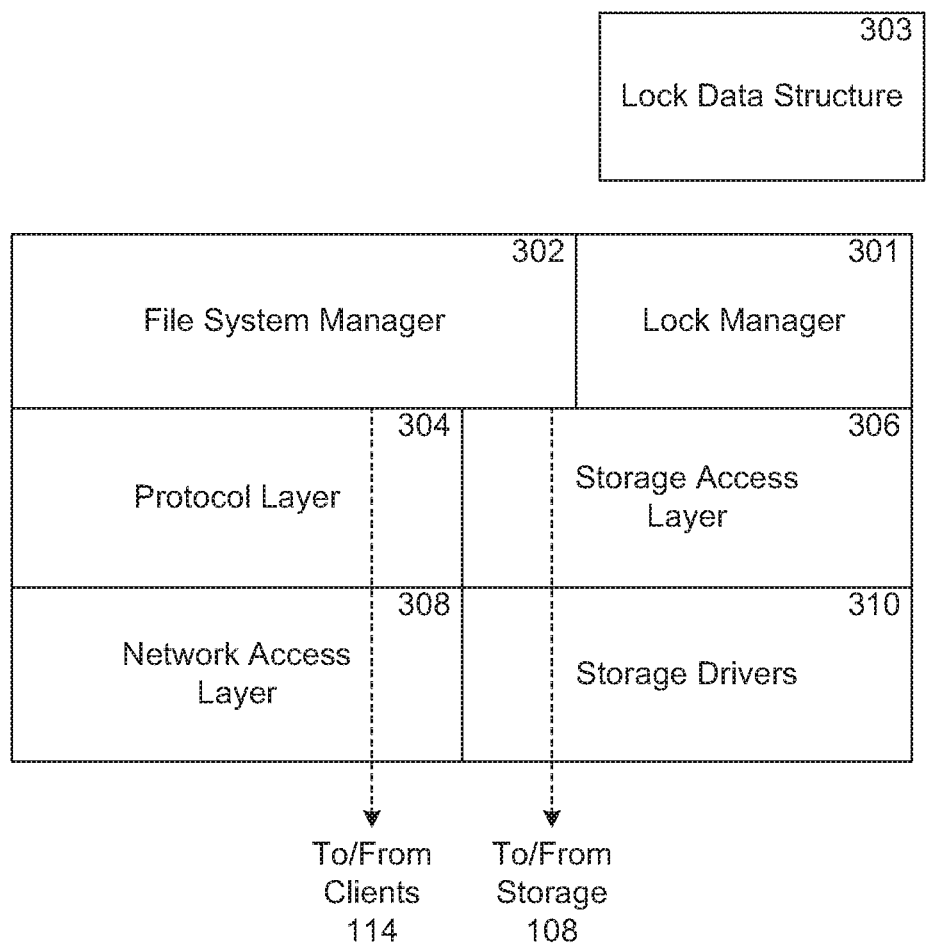
FIG. 3 illustrates an example of an operating system executed by a node in a high-availability cluster.

FIG. 3 illustrates an example of operating system 206 executed by node 102, according to one embodiment of the present disclosure. In one example, operating system 206 can include several modules, or "layers" executed by one or both of N-Module 104 and D-Module 106. These layers include a file system manager 302 that keeps track of a directory structure (hierarchy) of the data stored in storage devices and manages read/write operations. The operations includes read and write operations on storage devices in response to requests from the client 114. File system 302 can also include a lock manager 301 that maintains one or more lock data structures 303 for managing the various locks used for limiting access to data containers stored within cluster 100.

Operating system 206 can also include a protocol layer 304 and an associated network access layer 308, to allow node 102 to communicate over a network with other systems, such as clients 114. Protocol layer 304 may implement one or more of various higher-level network protocols, such as NFS, CIFS, Hypertext Transfer Protocol (HTTP), TCP/IP and others, as described below.

Network access layer 308 can include one or more drivers, which implement one or more lower-level protocols to communicate over the network, such as Ethernet. Interactions between clients 114 and mass storage devices 108 are illustrated schematically as a path, which illustrates the flow of data through operating system 206.

The operating system 206 can also include a storage access layer 306 and an associated storage driver layer 310 to allow D-module 106 to communicate with one or more storage devices. The storage access layer 306 may implement a higher-level disk storage protocol, such as RAID, while the storage driver layer 310 may implement a lower-level storage device access protocol, such as FC or SCSI. In one embodiment, the storage access layer 306 may implement the RAID protocol, such as RAID-4 or RAID-DP™ (RAID double parity for data protection provided by NetApp Inc.).

Figure 4A:
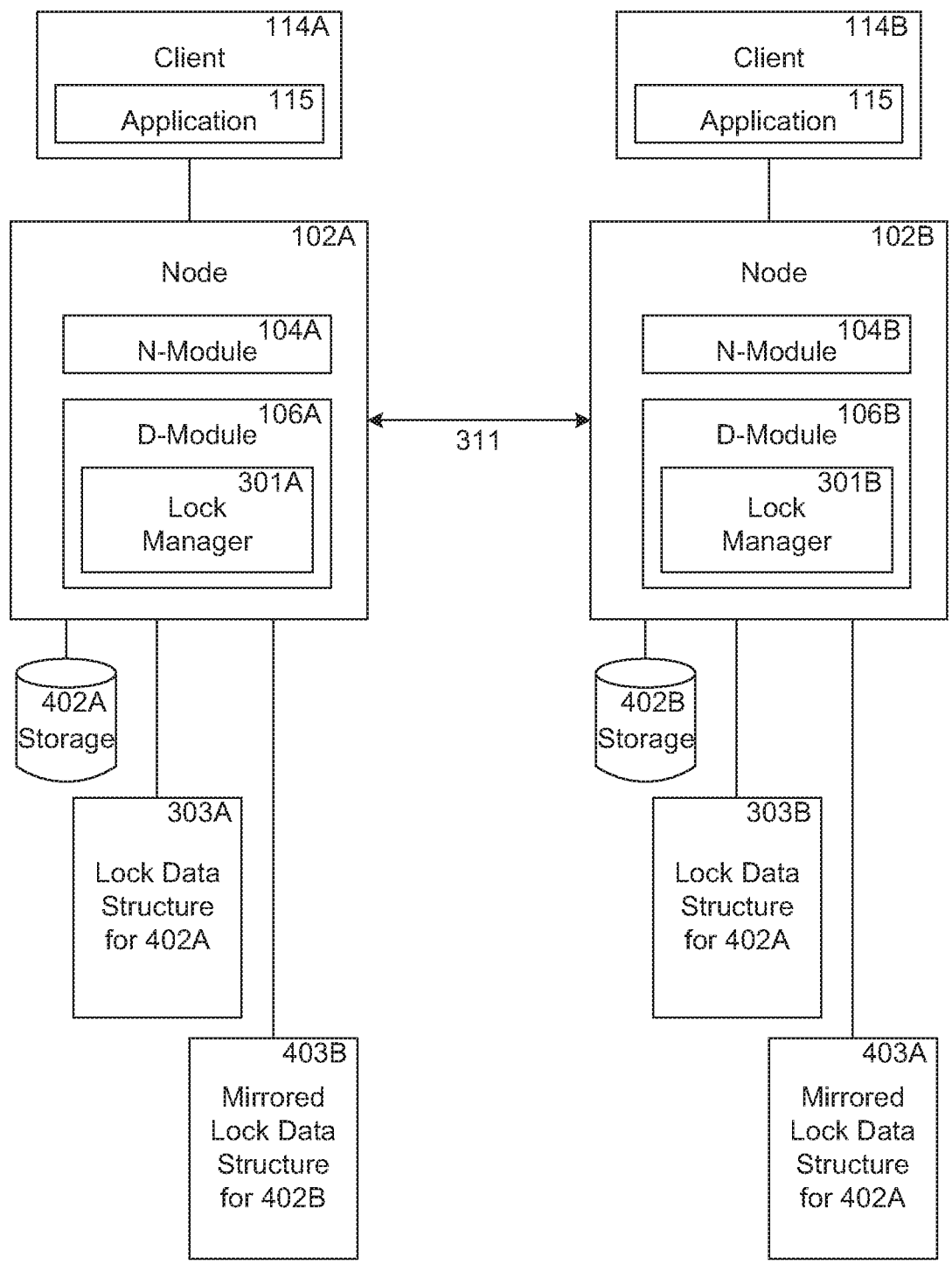
FIG. 4A shows two nodes that maintain and synchronize lock data structures and mirrored lock data structures.

As mentioned above the operating 206 system includes a lock manager 301 that maintains locks for clients for providing access to data containers. The lock manager 301 further maintains mirrored lock data structures that are used for reconstructing locks when a node in the cluster that interfaces with a client system becomes unavailable and the node that maintains the mirrored lock data structures takes over the storage space previously managed by the node that became unavailable. FIG. 4A illustrates two partner nodes that can implement the take over process.

FIG. 4A shows two nodes 102A, 102B that communicate with each other and maintain lock data structures 303A, 303B and mirrored lock data structures 403A, 403B, according to one embodiment. Node 102A can provide storage access to client 114A and node 102B can provide storage access to client 114B. In one embodiment, nodes 102A and 102B can be partner nodes in a High-Availability pair or cluster, which means that if node 102A fails, then node 102B can take over the storage 402A of node 102A to continue to provide data access service to client 114A, and vice versa. The process by which node 102B takes over the storage space 402A managed by node 102A may be referred to as "take over".

When node 102A comes back online and becomes available again, then node 102B can give the control of storage 402A back to node 102A such that node 102A may provide data access service to client 114A. This process is referred to as "give back".

The lock manager 301A for node 102A maintains a lock data structure 303A for locks on storage 402A, while the lock manager 301B for node 102B maintains its lock data structure 303B for locks on storage 402B. The lock data structures 303A and 303B are also referred to as original lock data structures. Lock data structure 303A includes information for all of the locks on storage 402A that are granted by node 102A. The lock manager 301A further maintains mirrored lock data structure 403B that includes lock state information for locks on storage 402B that are granted by node 102B to client 114B. Similarly, lock data structure 303B includes information for the local locks on storage 402B granted by node 102B. The lock manager 301B further maintains mirrored lock data structure 403A that includes lock state information for locks on storage 402A that are granted by node 102A to client 114A.

In one embodiment, a volatile memory of node 102A stores the lock data structure 303A and mirrored lock data structure 403B, and a volatile memory of node 102B stores the lock data structure 303B and mirrored lock data structure 403A.

Figure 4B:
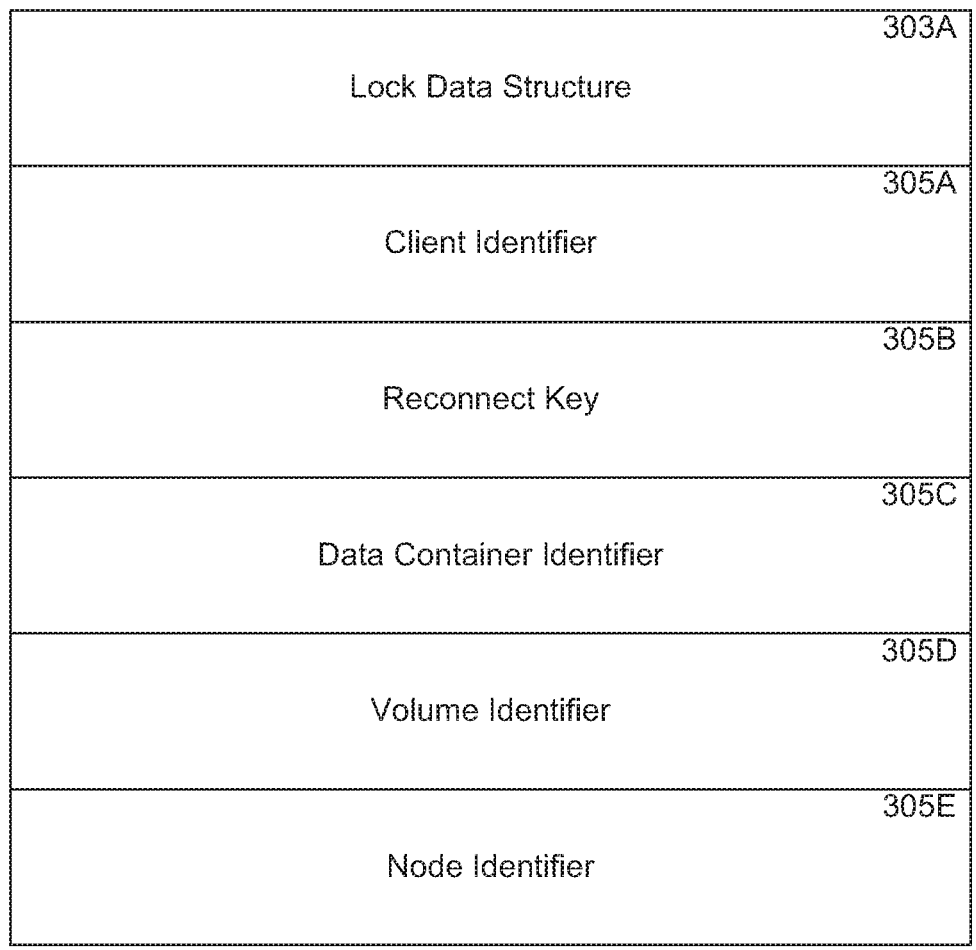
FIG. 4B illustrates fields of an example of a lock data structure.

FIG. 4B shows an original lock data structure 303A. A separate lock data structure such as this is maintained for each and every lock granted by the system. The lock data structure may include various metadata fields 305A-305F that can be used to reconstruct a lock and the values of which may be referred to individually or collectively as "lock state". A client identifier 305A identifies a client system that has been granted a lock. A reconnect key 305B is used by a client to access a lock for a persistent open lock type. The data container for which the lock is granted is identified by 305C. The storage volume associated with the data container is identified by 305D. The nodes that are allowed or not allowed to access the data container can be identified by node identifier 305E.

In one embodiment, a mirrored lock data structure for the original lock data structure can contain fewer fields than the original lock data structure. For example, a mirrored lock data structure can be a subset of the original lock data structure. To have a small memory footprint and to enable fast transfer, a mirrored lock data structure only stores information necessary to reconstruct a corresponding lock data structure.

Typically, the mirrored lock data structures have smaller sizes than the original lock data structures. Thus, the mirrored lock data structures take smaller memory space than the original lock data structures. In one embodiment, nodes within a storage cluster use remote procedure calls (RPCs) to transfer information related to the locks. Each RPC message can only carry a limited amount of information, it takes fewer RPC messages for the mirrored lock data structures than the original lock data structures to transfer the lock information to other nodes. However, the lock manager running on any node of the storage cluster can not recognize and operate the mirror lock data structures directly. Mirrored lock data structures are subsets of the original lock data structure that the lock manager maintains. The mirrored lock data structures can be in compressed form to save memory space and are not regularly accessed by the storage cluster. There are times when a cluster needs to reconstruct data structures for locks, based on the mirrored lock data structures stored in a memory of a node. Mirrored lock data structures contain sufficient information (metadata) for the locks to enable the lock data structure for the locks to be constructed based on the mirrored lock data structures.

For example, for non-disruption operation (NDO), node A has stored mirrored lock data structures for storage of node B (nodes A and B are partner node in a HA pair) before a take over event. During the take over event, the node A takes over storage of the node B. The node A needs to reconstruct the lock data structure for the storage taken over from node B so that the lock manager in the node A can service the lock requests for the storage.

Figure 5:
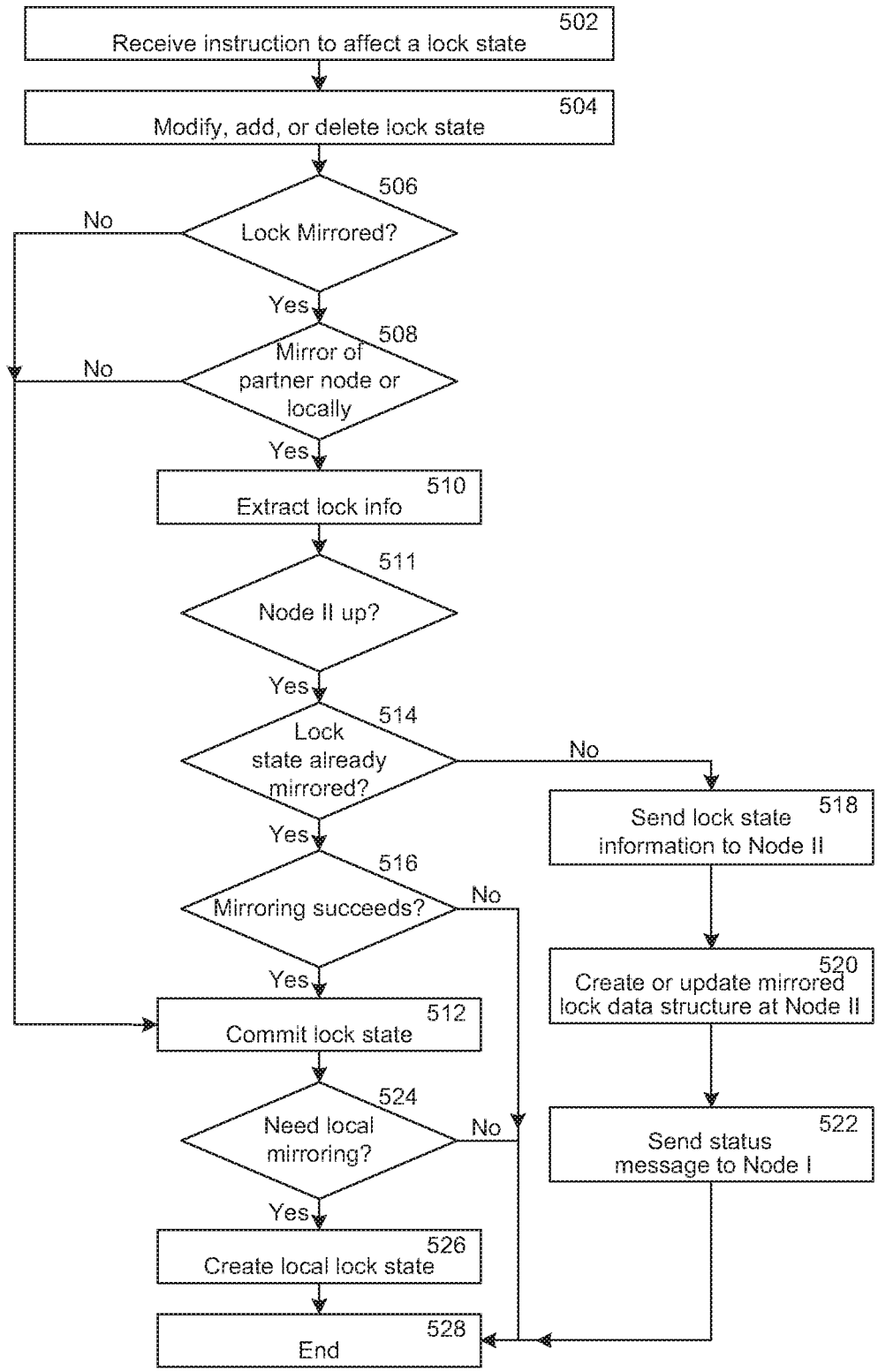
FIG. 5 shows an example of a process for updating lock state information between partner nodes in a high-availability cluster.

FIG. 5 shows a detailed process 500 for handling lock state information between partner nodes 102A (Node I) and 102B (Node II) described above with respective to FIG. 4A, according to one embodiment. The process begins at step 502, when node 102A receives an instruction to affect a lock state associated with a data container. For example, node 102A can receive a client request to open a data container on storage 402A for a read or write operation in a persistent fashion.

At step 504, node 102A modifies, adds, or deletes lock state of the lock associated with the data container, at the local memory of node 102A according to the instruction. At step 506, the lock manager 301A determines whether the lock needs to be mirrored. In one embodiment, a lock will need to be mirrored if it has a persistent open feature. If the lock is not to be mirrored at step 506, then the process moves to step 512 that is described below.

If the lock is to be mirrored, then at step 508, the lock manager 301A determines if local or partner mirroring is needed. If local or partner mirroring is not needed, then the process moves to step 512. The storage cluster need conduct local or partner mirroring in various scenarios. For example, the storage cluster can conduct a partner mirroring during a give back process, which is discussed herein in the detailed description of FIG. 7 and its related paragraphs. Or the storage cluster can conduct a local mirroring during an aggregate relocation operation, which is discussed in details in the FIG. 8 and it related paragraphs.

If local or partner mirroring is needed, then the necessary lock state information for mirroring is extracted from an original lock data structure at step 510. The necessary lock state information depends on the lock type. For example, for a shared lock, the necessary lock state information may include client identifier information, reconnect key, data container identifier, volume identifier where the data container is stored or any other information. The reconnect key is typically provided to a client for a persistent open lock. The client uses the reconnect key when node 102A becomes unavailable and the client needs to use the same lock either when node 102A becomes available again or if node 102B takes over.

At step 511, node 402A determines if partner node 102B (node II) is available. In one embodiment, node 102A can determine this by sending a status message to node 102B using connection 116. If the partner 102B is unavailable, then the process moves to step 512.

If partner 102B is available, then at step 514, the lock manager 301A determines if the lock state has already been mirrored. If the lock state has already been mirrored, then at step 516, lock manager 301A determines if the mirroring process succeeds. This can be determined by receiving a status message from node 102B. If the mirroring succeeded, then the process moves to step 512. If the mirroring did not succeed, then at step 528, the process ends and optionally an error message can be sent to client 114A.

If the mirroring has not occurred at step 514, then at step 518, the lock state information (e.g. metadata in fields' 305A-305F) is sent by node 102A to node 102B. The lock state information includes minimal information that can be used by node 102B to generate a lock data structure for a lock, if node 102A becomes unavailable. At step 520, node 102B creates or updates the lock information at mirrored lock data structure 403A. Node 102B then sends a status message to node 102A at step 522 indicating node 102B has the up-to-date lock information.

At step 512, the lock state is committed to storage device 402A of node 102A from memory. Thereafter at step 524 determines if mirroring of any lock states is needed at node 102A. This step can happen when node 102B gives back control to node 102A, after node 102A became unavailable and node 102B took over. Local mirroring can be needed when locks are created at a partner node or are changed at a partner node. If local mirroring is not needed, then the process ends at step 528. If local mirroring is needed, then at step 526, node 102A creates the lock state information at lock data structure 303A.

Figure 6:
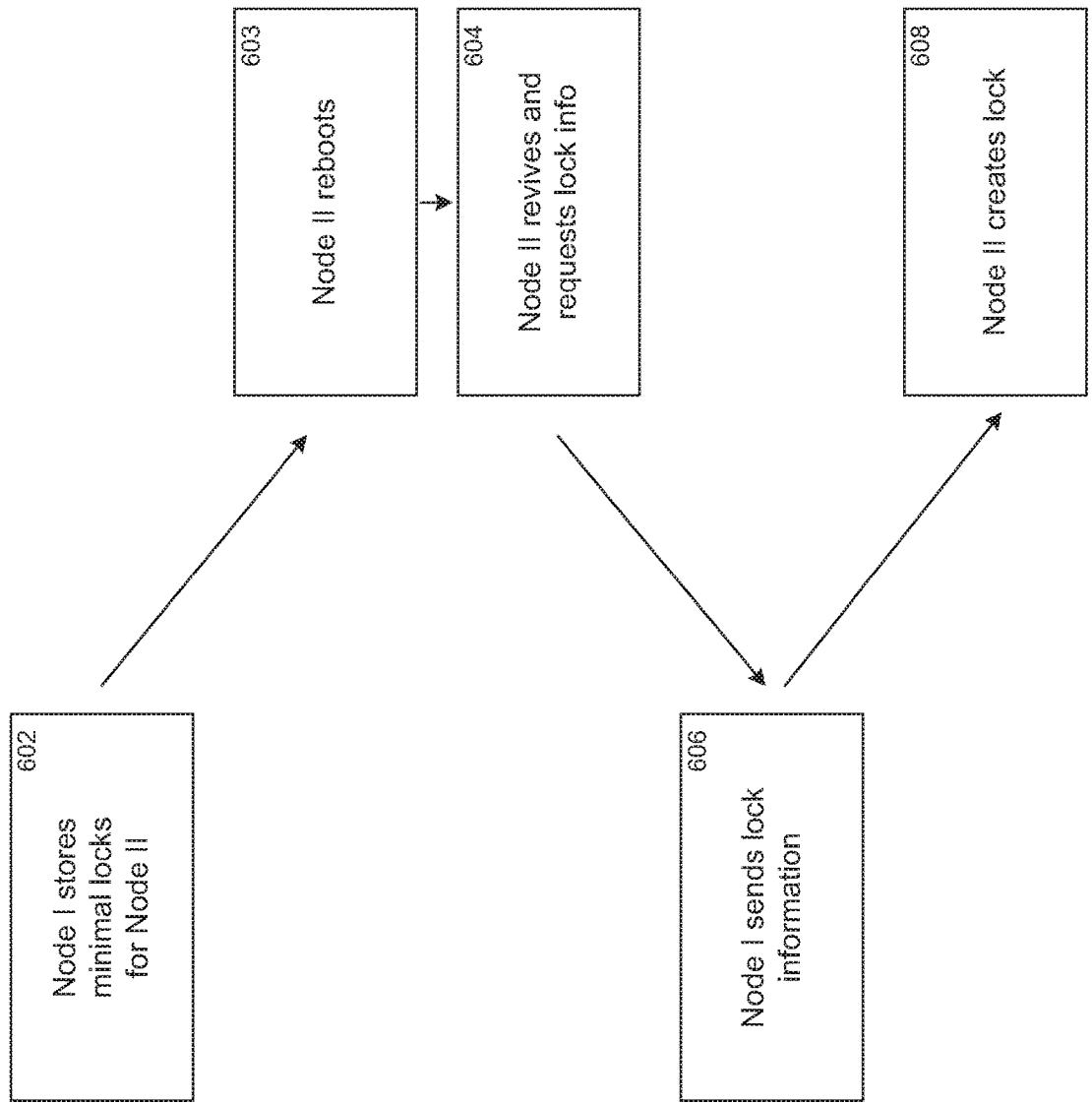
FIG. 6 shows an example of a takeover process for exchanging lock state information between two nodes within a high-availability cluster.

The mirroring process can happen in various scenarios during the operation of the storage cluster. For instance, FIG. 6 shows a takeover process 600 that involves exchanging lock state information between node 102A (shown as node I) and 102B (shown as node II), according to one embodiment. At the start of process 600, at step 602, node 102A is fully operational responding to client 114 requests, having valid lock states for itself as well as partner node 102B. At step 603, as an example, node 102B is rebooting and hence the lock states for node 102A are unavailable from node 102B memory. Node 102B may be rebooting for any reason, such as a communication failure. When node 102B is unavailable, partner node 102A takes over responsibility for providing services in relation to the storage volumes of node 102B.

At step 604, node 102B revives and sends a message to node 102A indicating that node 102B wants to take back the control of its storage and requesting that node 102A send lock state information for its storage. At step 606, as part of a give back procedure, node 102A sends the lock state information related to the locks for the storage to be given back to node 102B. The lock state information that is sent to node 102B can include the locks that are owned by node 102A and the locks that were owned by node 102B before the rebooting at step 603.

At step 608, node 102B creates a lock data structure for its storage based on the transferred lock state information. Node 102B also maintains a mirrored lock data structure for storage owned by node 102A.

The embodiments disclosed herein have advantages because when a node becomes unavailable and another node takes over for it, client access to data containers and locks is maintained because the partner node can construct the locks that were issued by the node that became unavailable. This is especially helpful in an environment where multiple clients are accessing data containers and using locks.

As FIGS. 5 and 6 show, each node in a high-availability cluster (or pair) keeps mirrored lock data structure for the storage on its partner node. If one of the nodes (first node) is not available during any event, the other partner node (second node) can take over the storage volumes from the unavailable first node and continue serving the clients. Since the second partner node has the mirrored lock data structure for the volumes from the unavailable first node, the second node can reconstruct the lock data structure based on the mirrored lock data structure, and therefore maintain the lock information for all volumes without disputing clients' data access operation requests. Thus, the high-availability cluster maintains the capability of non-disruptive operation (NDO).

Once the first node revives (or a new first node replaces the original first node), the first node requests the second node to give back the control of the taken-over storage volumes. Because the revived first node does not have the proper lock data structure in its memory, the first node needs to request the necessary lock information from the second node, during the give back process, to reconstruct the lock data structure in its memory. Further, the first node needs to receive lock information for the second node's storage volume to maintain mirrored lock data structure for the second node, so the first node can take over the second node's storage volume in case the second node becomes unavailable. Therefore, it is desirable to have a mechanism to synchronize mirrored lock data structure on the second node to the first node, while still allowing client operations to change the lock state in the meantime.

Figure 7:
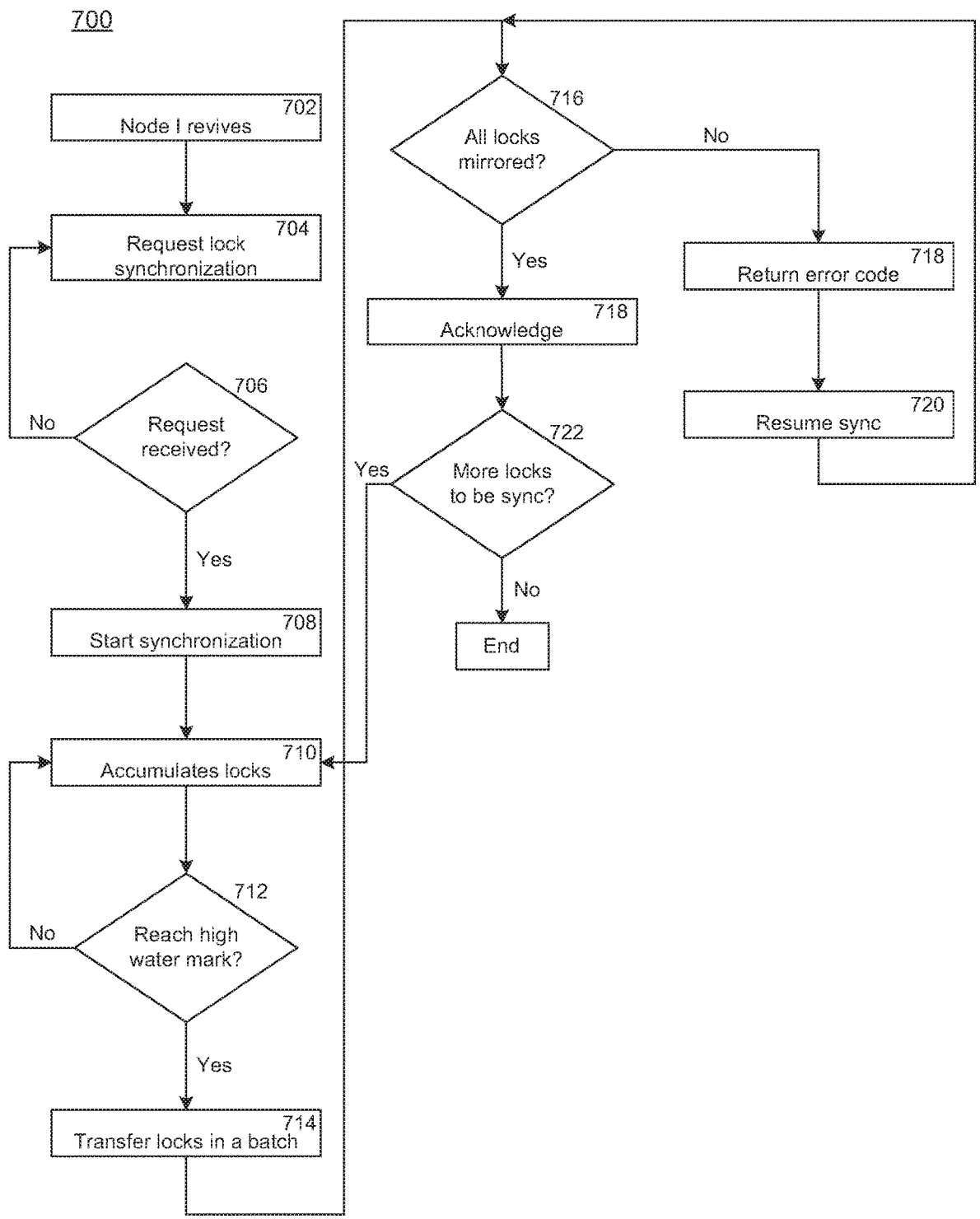
FIG. 7 shows an example of a process flow for synchronizing lock state information between two partner nodes within a high-availability cluster during a give back process.

FIG. 7 shows a process flow for synchronizing lock state information between two partner nodes (shown as node I and node II) within a high-availability cluster during a give back process, according to one embodiment. At the initial step 702 of the give back process 700, node I in an HA pair revives and boots up. At that moment, the node I does not have any lock information of the locks for the storage volumes controlled by its partner node II. Among the storage volumes being controlled by node II, one or more storage volumes are initially assigned to node II, while some other storage volumes are initially assigned to node I and taken over by node II during a take over process when node I fails or is brought off-line. In other embodiments, node I can revive after other events, such as hardware replacement or even node replacement. In another embodiment, node II is in a single node cluster and node I joins the cluster as an HA partner.

In order to receive lock information from node II, at step 704, node I sends a message, such as a remote procedure call (RPC) to its partner node II to request for lock synchronization. If the partner node II receives the lock synchronization request (706), node II starts the process of mirroring its locks to the node I (708). There are two groups of locks that need to be synchronized to node I. First, node I waits for a give back of storage volumes that are initially assigned to node I, thus node I needs lock data structure to be present locally for the storage volumes that node I will receive during the give back process. Second, node I will also need the mirror lock data structure for the storage volumes that are initially assigned to node II, in order to be able to take over node II for maintaining Non-Disruption Operation in case node II fails.

In one embodiment, lock synchronization is done as a background task when a node receives the request. Node II sets a threshold for locks that need to be mirrored. The threshold represents a maximum number of locks that will be mirrored by lock synchronization in one batch. For new locks that are not included in one batch lock synchronization due to the threshold, data access operations are responsible for mirroring them to the HA partner when new locks are created locally.

During the lock synchronization process, node II accumulates a bulk of locks (710). Once the number of accumulated locks reaches the threshold (also referred to as a high water mark) (712), node II transfers metadata that indicates states of variables that represent the accumulated locks in a batch mode to the HA partner node I (714). In one embodiment, node II keeps track of locks that are currently being mirrored by using two cursors. A cursor is a pointer to a sequence number. Sequence numbers are assigned to locks in a monotonically increasing order. Every new lock that is created on a node is tagged with a new sequence number. Lock synchronization mirrors locks in the order of increasing sequence number. Once a full batch of locks is accumulated, node II sends the locks in a batch to node I, wherein the cursor values of the first and the last lock defines the range of locks to be mirrored.

In one embodiment, these two cursors are in the form of two global variables: a start cursor and a last cursor. For a given lock, it has already been mirrored by lock synchronization if its sequence number is smaller than the start cursor. A lock is included in a batch of locks to be mirrored if its sequence number is greater than or equal to the start cursor, and the sequence number is less than or equal to the last cursor. A lock is not yet to be considered for mirroring if its sequence number is greater than the last cursor.

On the receiver side, node I returns a success message in the response (718) if all of the locks in the incoming request are mirrored successfully (716). If more locks need to be synchronized (722), node II accumulates another batch of locks and transfers the metadata for the locks to node I. Otherwise at 718, an error code is returned with the number of locks that have been mirrored successfully. Upon receiving the error code, the sender can resume the lock synchronization from the first lock in the batch whose mirroring fails (720).

While batch mirroring is in progress, data access operations can still modify the locks. When the cluster receives a request of modifying a lock, one of the following three actions will be taken by data access operations. First, if the lock has already been mirrored by lock synchronization, the data access operation itself is responsible for mirroring any state change of the lock to the partner node. Second, when the mirroring is on-going for the lock that the data access operation attempts to modify, a retry error code is returned to the client that initiated the data access operation to instruct the client to retry the data access operation after a predetermined time period. Once receiving the retry error code, the client can choose to retry the data access operation after the predetermined time period. Third, if the lock to be modified has not been mirrored and is not in the batch to be mirrored, no mirroring is required by the data access operation, since lock synchronization will eventually mirror the updated lock state in the future.

This process enables non-disruptive operation for persistent locks after the giveback or a node join event. Client operations can continue modifying lock state while lock synchronization is in progress. Once the lock synchronization completes, the HA cluster restores the non-disruption operation of locks for the storage volumes in the HA cluster.

Besides the take over and give back processes, the running of an HA cluster can involve other processes, including resync, volume move and aggregate relocation. The following paragraphs describe a mechanism to retain the non-disruptive capability for locks after an aggregate has been relocated.

For reasons including load balancing and maintenance, a node (source node) in an HA pair can give a control of its aggregate to its partner node (also referred to as a destination mode) in the HA pair. The process is called aggregate relocation. The aggregate relocation from the source node to the destination node proceeds in steps as disclosed in the following paragraphs.

Figure 8:
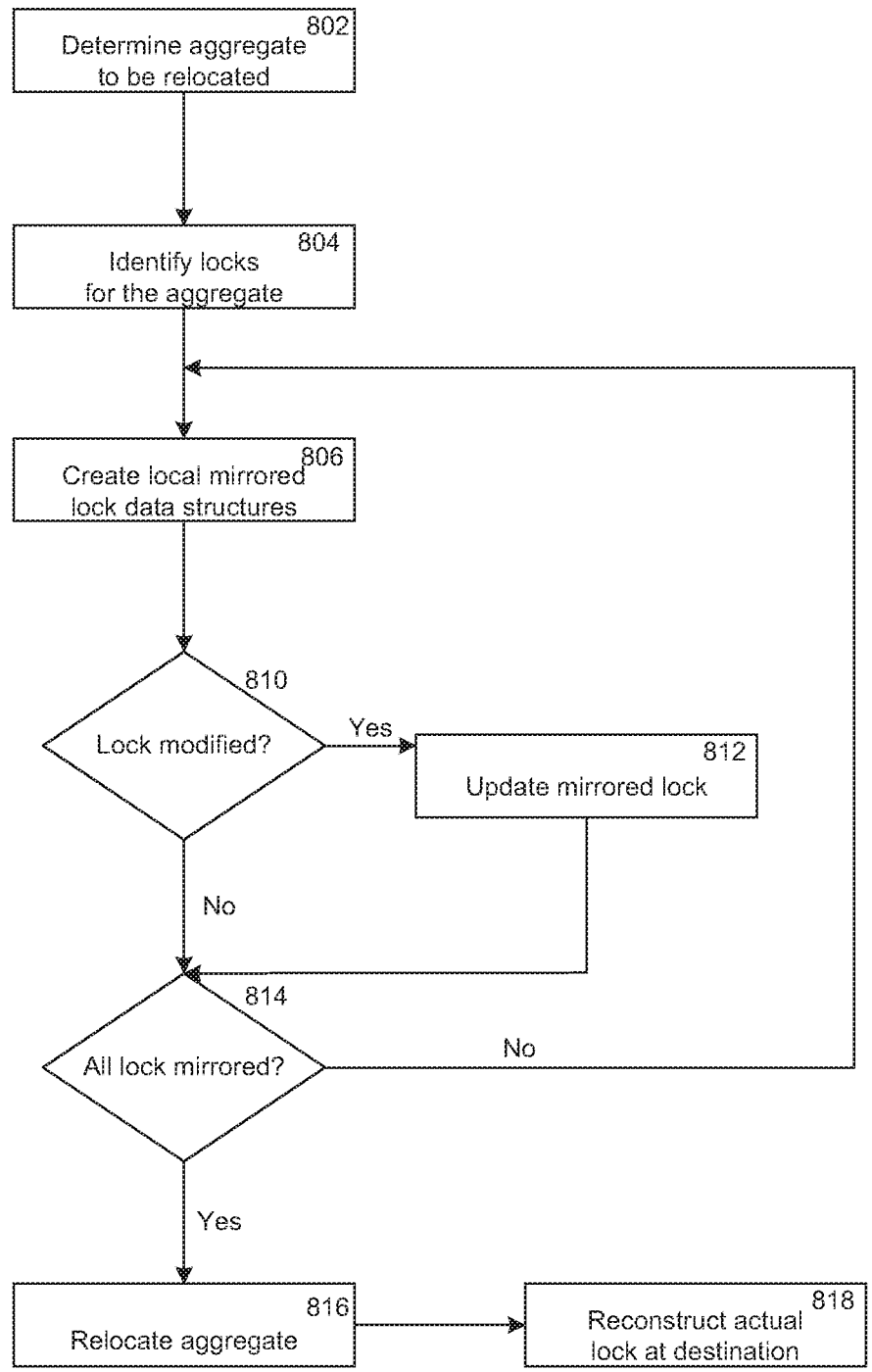
FIG. 8 shows an example of a process flow for maintaining mirrored lock state information between two partner nodes during an aggregate relocation process.

FIG. 8 shows a process flow for maintaining mirrored lock state information between two partner nodes during an aggregate relocation process 800. At step 802, the source node first determines an aggregate to be relocated to a partner node (also referred to as destination node). Then, the source node identifies the locks for the aggregate to be relocated (804) and creates mirrored lock data structures for these identified locks in the memory of the source node (806). The process is called local lock-sync. If a data access operation from a client modifies a lock that is identified for aggregate relocation (810), the source node will update the mirrored lock data structure in its local memory accordingly (812).

The aggregate will not be allowed to relocate until the local lock sync between the mirrored lock data structure and the original lock data structure for the aggregate completes. Once this local lock-sync completes (814), the source node can relocate the aggregate to the destination node (816). Since both the source node and the destination node are within the same high-availability pair, during the aggregate relocation the destination node takes over the control of the aggregate. When the destination node takes the control of the aggregate, both the destination node and the source node already have mirrored lock data structure for the relocated aggregate from which the original lock data structures can be reconstructed in case the destination node fails. Therefore, at the end of aggregate relocation process, the destination node assumes control of the related aggregate and reconstructs original lock data structure for the aggregate (818); while the source node maintains a synchronized mirrored lock data structure for the same aggregate. Thus, the HA pair retains the non-disruption capability; at this point, the HA pair can have either node crashed and still retain lock state for non-disruptive operation. During or after the aggregate relocation process, the HA pair continues to maintain the non-disruption capability.

With the mirrored lock data structure being kept in a partner node, the partner node can recover the locks from the mirrored lock data structure when a takeover occurs. In this way, the client's data access rights based on the locks are kept non-disruptively. This non-disruptive operation (NDO) capability for locks requires mirrored lock data structure on the partner node to be kept in sync with original locks on the other node all the time.

However, it is possible that mirrored the lock state can go out of sync for various reasons. For example, an HA cluster may process lock mirroring using remote procedure call (RPC) between two nodes in the HA cluster. An RPC message can fail to reach the other node due to a network communication failure. When that occurs, mirrored lock data structure on the partner node can become out of sync with original locks, thereby resulting in the loss of NDO capability for the locks. As another example, data access operation can send an RPC to create mirrored lock structure on the partner node prior to creating original locks locally. It is possible that the data access operation may fail for certain reasons after the mirrored lock state gets created but before original locks are created. In such a case, the data access operation would attempt to send an undo RPC to revert the mirrored lock state change on the partner. However, sending an undo RPC can also fail due to network communication failures. As a result, the partner node would have mirrored lock state corresponding to original locks which don't exist. If a takeover occurs at this moment, the locks are reconstructed from this stale mirrored lock data structure, and the reconstructed locks can conflict with new lock operations until they are cleaned up.

When out-of-sync situation occurs, NDO capability for the out-of-sync lock is lost. Thus, it is necessary to recover from the out-of-sync state as soon as possible, so that NDO capability can be restored in an efficient manner. To recover from the out-of-sync state and restore NDO capability, an automatic resync mechanism resynchronizes the mirrored lock data structure with original locks on a per-file basis in the background immediately when an out-of-sync condition is detected. While the resync is in progress, data access operations are allowed to modify the lock state in the meantime without being blocked.

Figure 9:
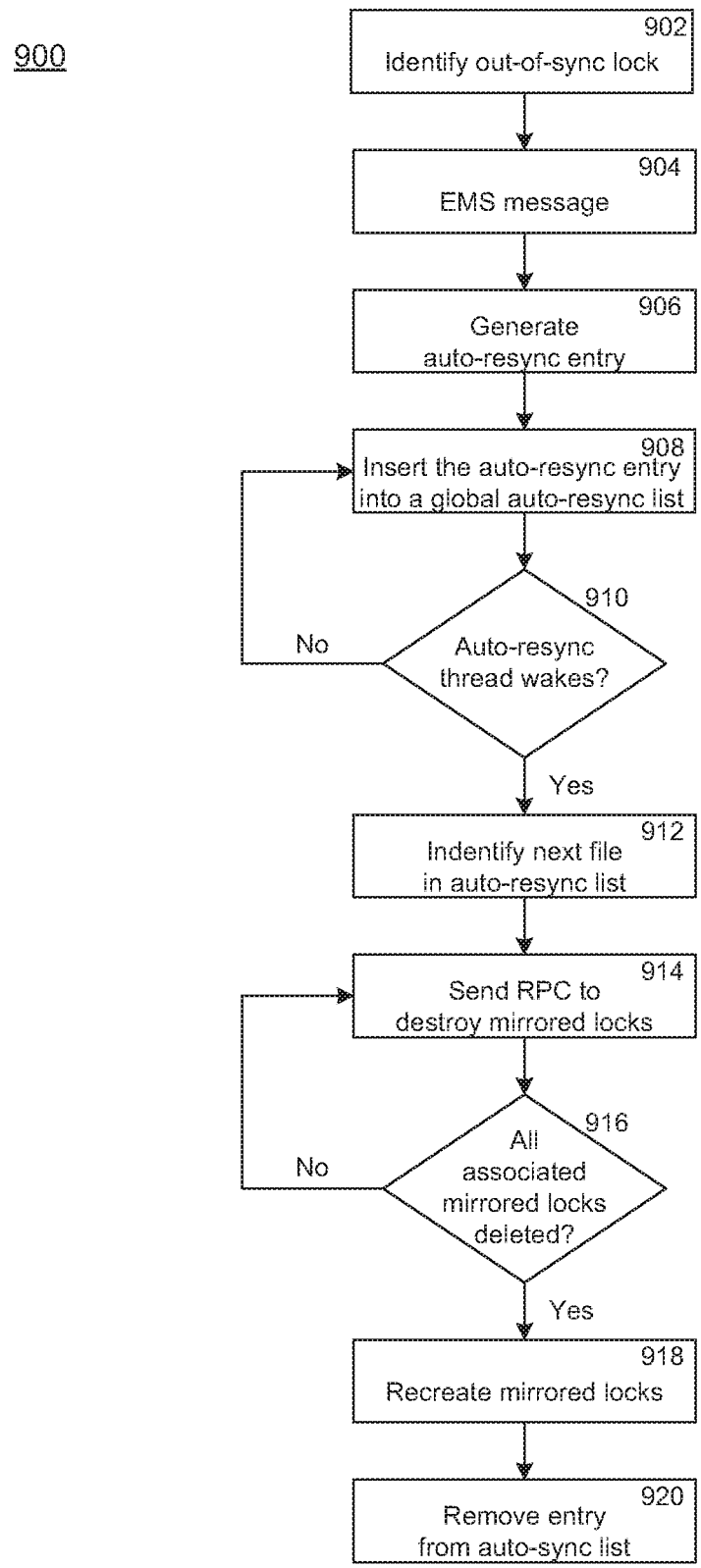
FIG. 9 shows an example of a process flow for a lock resync process on a per-file basis.

FIG. 9 shows a process flow for a lock resync process on a per-file basis. In the embodiment illustrated in FIG. 9, files are used as examples of data containers. In other embodiments, the data storage system can store data in data containers other than files and can conduct the lock resync process on a per-data container basis. When a data access operation identifies a file for which the mirrored lock data structure may have gone out of sync with the original lock data structure (902), the data access operation first throws a system message (e.g. Event Management System (EMS) message) indicating that an out of sync condition has occurred (904). EMS is a logging system that is used to record and report events. In one embodiment, the EMS message can contain the server name, volume name, and file identifier (ID) to uniquely identify the data container (e.g. the file) whose mirrored lock state has gone out of sync. By generating the message, the data access operation informs the system and its administrator that NDO capability for the identified file has lost from that moment on. After the message, an auto-resync entry is generated (906) and populated with the file system ID and file ID, which are internal identifications for a given file in a storage cluster. This auto-resync entry is then inserted into a global auto-resync list (908), which contains a list of files that requires resynchronizing their mirrored lock data structures. In one embodiment, files on the auto-resync list are also inserted into a hash table to enable subsequent fast lookup.

In one embodiment, a dedicated auto-resync thread is responsible for lock data structure resynchronization. This auto-resync thread is created in the initialization phase of the lock manager subsystem during the node boot up time. Once the creation of the auto-resync thread completes, the thread is suspended in a system queue. Whenever a new auto-resync entry is inserted into the auto-resync list, the node awakens the auto-resync thread to process the lock resynchronization. When there are no entries queued in the auto-resync list, the node suspends the auto-resync thread again. After the auto-resync thread awakens (910), a handler for this thread picks the first entry for a file in the auto-resync list and identifies the locks for the file that are qualified for mirroring (912).

Then the thread constructs and sends an RPC to the partner node to destroy all existing mirrored lock data structures associated with the file (914), and recreates new mirrored lock data structures for this file based on the existing original lock data structures for the file. In one embodiment, the RPC request can contain the file system ID and the file ID, which uniquely identify the file for which lock state is being resynchronized. The request can also include metadata extracted from original lock data structures which need to be mirrored.

When the partner node receives the RPC, the handler for this RPC first looks up the file on which the resynchronization is taking place and then discards any existing mirrored lock data structures for that file including the mirrored lock data structure that is out-of-sync (also referred to as stale lock data structure). After the partner node deletes the existing mirrored lock data structures for the file (including the stale lock data structure) (916), the partner node recreates the mirrored lock data structures for the file using the metadata extracted from original lock data structures in the RPC request (918). In another embodiment, the partner node can receive the necessary metadata for recreating mirrored lock data structure via separate messages, instead of the RPC request. In the resync process, lock state resynchronization for a file is an atomic operation in the sense that all mirrored locks for this file are brought back in sync together regardless which lock is out of sync for the file.

When the lock state resynchronization completes successfully for the file, the auto-resync thread removes that entry for the file from the auto-resync list (920). The auto-resync thread further issues another message (e.g. an EMS message) to indicate that the file's mirrored lock data structure is back in sync and the NDO capability for the specified file is restored.

While a resync entry for a file is present in the lock-resync list, a data access operation can still modify the locks for the file. In that case, there is no need for data access operations to mirror the change to the partner node if the entry of the affected file is still waiting in the auto-resync list to be resynchronized. However, if the lock resynchronization for the file is ongoing, the processes that have initiated the data access operations are notified to retry until lock resynchronization completes for that file. For example, a client can initiate a request to write a file. Accordingly, the N-blade of the node that receives the request issues a data access operation to the D-blade of the node that contains the target data, for a lock on the file. The node finds out that a lock resynchronization is ongoing for that file. Thus, the D-blade of the node sends a retry message to the N-blade. After waiting for a predetermined time period, the N-blade can issue a data access operation to the D-blade again for the lock on the file.

The automatic resync mechanism brings the mirrored lock data structure back in sync with the original locks. This lock state resynchronization technique can be used as a general mechanism to properly handle various data access operation failures or mirroring RPC failures which cause mirrored lock data structures being out-of-sync. Triggering resynchronization immediately after the out-of-sync condition is detected allows NDO capability for locks to be restored as soon as possible, therefore it minimizes the time period during which NDO capability is unavailable. Data access operations that modify lock state are allowed to progress without being blocked while the resynchronization is in progress.

Figure 10:
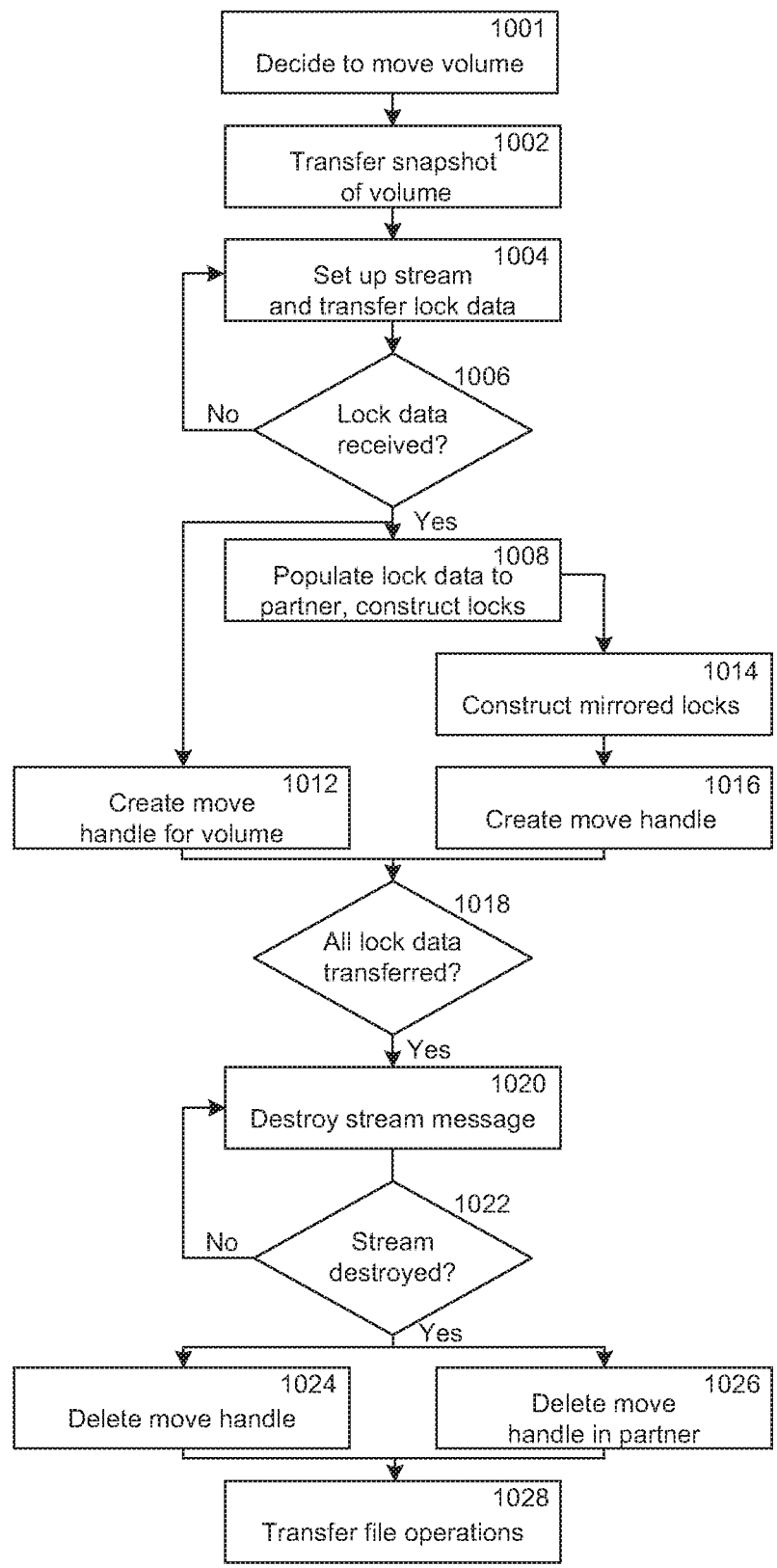
FIG. 10 shows an example of a process flow for handling locks when a cluster moves a volume.

Besides aggregate relocation processes, a cluster may also need to keep mirrored lock state information updated for other scenarios such as volume moving. FIG. 10 shows a process flow for handling locks when a cluster moves a volume. In the illustrated example, a cluster stores a volume in node I. The cluster includes an HA pair A of node I and node II, and further includes another separate HA pair B of node III and node IV. At step 1001, the cluster decides to move a volume currently stored in node I (of HA pair A) of the cluster, to node III which belongs to a different HA pair B from node I.

In order to maintain an NDO for the volume, the cluster needs to make sure that after volume moving, mirrored lock data structure is available in an HA partner node (node IV) of the destination node (node III) for taking over the volume. First at step 1002, the node I transfers the snapshot of the volume to node III. At that moment, node I still services the data request for the volume to be moved. At step 1004, the cluster sets up a lock data stream between the node I and node III by reserving network ports of the node I and node III, and metadata related to the locks for the volume to be moved is transferred from the node I to node III via the lock data stream. If node III detects the receipt of lock metadata (1006), node III starts to construct the lock data structures for the incoming volume and send the lock metadata to node IV through messages such as RPCs (1008). When node III receives the metadata for the first lock (1010), node III creates a move handle for the volume (1012). Upon receiving RPCs including the lock data, node IV constructs and stores the mirror lock data structure in its memory (1014). Likewise, node IV creates a move handle for the volume when node IV receives data from the first lock (1016).

Once node I has transferred all data related to locks for the volume to be moved to node III via the lock data stream (1018), node I sends a stream destroy message to node III to indicate that all data is transferred and the stream will be closed (destroyed, 1020). Once node III receives the stream destroy message from the node I (1022), node III deletes the move handle for the volume (1024). Further, node III instructs its partner node IV to delete the move handle from node IV (1026). Then at step 1028, node I transfers all operations on the volume to node III, so that node III starts to service the data access operations on the volume, while maintaining the NDO.

The node III and node IV use the move handles to determine whether the volume moving (including the locks) is finished properly. If node III (or node IV) receives a takeover request while the move handle still exists, node III can determine that received locks are not valid for the volume (e.g. partially received locks) and discards the received locks.

In one embodiment, a storage cluster moves a storage volume within a node of the storage cluster. The node can generate mirrored lock data structures based on the original lock data structures for the storage volume. The node can further send the mirrored lock data structures to a HA partner node.

The techniques introduced herein can be implemented by, for example, programmable circuitry (e.g., one or more microprocessors) programmed with software and/or firmware, or entirely in special-purpose hardwired circuitry, or in a combination of such forms. Special-purpose hardwired circuitry may be in the form of, for example, one or more application-specific integrated circuits (ASICs), programmable logic devices (PLDs), field-programmable gate arrays (FPGAs), etc.

Software or firmware for use in implementing the techniques introduced here may be stored on a machine-readable storage medium and may be executed by one or more general-purpose or special-purpose programmable microprocessors. A "machine-readable storage medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible storage medium includes recordable/non-recordable media (e.g., read-only memory (ROM); random access memory (RAM); magnetic disk storage media; optical storage media; flash memory devices; etc.), etc.

The term "logic", as used herein, can include, for example, programmable circuitry programmed with specific software and/or firmware, special-purpose hardwired circuitry, or a combination thereof.

In addition to the above mentioned examples, various other modifications and alterations of the invention may be made without departing from the invention. Accordingly, the above disclosure is not to be considered as limiting and the appended claims are to be interpreted as encompassing the true spirit and the entire scope of the invention.

What is claimed is:

1. A method comprising:
    transmitting a lock synchronization request by a first node of a storage system to a second node operating as a high-availability partner node for non-disruptive operation (NDO) of the storage system in servicing client requests, where the second node takes over client requests for the first node upon the first node becoming unavailable due to an event, and when the first node becomes available, the second node returns control back to the first node for processing the client requests for the first node;
    wherein the first node stores lock information for a first lock issued by the first node at a first lock data structure at the first node and mirrors, at a first mirrored lock data structure, second lock state information of a second lock issued by the second node, and the second node stores second lock information for the second lock at a second lock data structure and mirrors first lock state information of the first lock at a second mirrored lock data structure;
    receiving at the first node, in response to the lock synchronization request, metadata with lock state information for a number of locks determined by the second node to meet a threshold value, the threshold value determined by the second node by tracking sequence numbers for locks waiting to be synchronized at any given time; and
    utilizing the received metadata to reconstruct the first lock issued by the first node at the first lock data structure, prior to the first node becoming unavailable due to the event and
    utilizing the received metadata for synchronizing the second lock state information at the first mirrored lock data structure, the second lock state information includes a reconnect key associated with an exclusive lock for a data container to allow a client to obtain the exclusive lock from the second node after the first node becomes unavailable.

2. The method of claim 1, further comprising:
    identifying by the second node an out-of-sync lock for the data container; and
    inserting an auto-sync entry in a global auto-sync list having a list of data containers that require resynchronization.

3. The method of claim 2, further comprising:
    notifying the first node by the second node to delete mirrored lock state information for the data containers in the list; and
    transferring lock metadata with lock state information for the deleted mirrored lock state information to the first node from the second node.

4. The method of claim 3, further comprising:
    recreating deleted mirrored lock state at the first node based on the transferred lock metadata.

5. The method of claim 1, wherein the second node identifies a storage aggregate and a plurality of data container locks for relocation to the first node, and creates a local mirrored lock data structure at a memory of the second node with lock state information for the plurality of data container locks.

6. The method of claim 5, wherein the second node relocates the storage aggregate to the first node with lock state information for the data container locks.

7. The method of claim 6, wherein the first node reconstructs the plurality of data container locks using the relocated lock state information and continues the NDO of the storage system.

8. A non-transitory, machine readable storage medium having stored thereon instructions for performing a method, comprising machine executable code which when executed by at least one machine, causes the machine to:
    transmit a lock synchronization request by a first node of a storage system to a second node operating as a high-availability partner node for non-disruptive operation (NDO) of the storage system in servicing client requests, where the second node takes over client requests for the first node upon the first node becoming unavailable due to an event, and when the first node becomes available, the second node returns control back to the first node for processing the client requests for the first node;
    wherein the first node stores lock information for a first lock issued by the first node at a first lock data structure at the first node and mirrors, at a first mirrored lock data structure, second lock state information of a second lock issued by the second node, and the second node stores second lock information for the second lock at a second lock data structure and mirrors first lock state information of the first lock at a second mirrored lock data structure;
    receive at the first node, in response to the lock synchronization request, metadata with lock state information for a number of locks determined by the second node to meet a threshold value, the threshold value determined by the second node by tracking sequence numbers for locks waiting to be synchronized at any given time; and utilize the received metadata to reconstruct the first lock issued by the first node at the first lock data structure, prior to the first node becoming unavailable due to the event; and utilize the received metadata for synchronizing the second lock state information at the first mirrored lock data structure, the second lock state information includes a reconnect key associated with an exclusive lock for a data container to allow a client to obtain the exclusive lock from the second node after the first node becomes unavailable.

9. The storage medium of claim 8, wherein the machine executable code further causes the machine to:

identify by the second node an out-of-sync lock for the data container; and insert an auto-sync entry in a global auto-sync list having a list of data containers that require resynchronization.

10. The storage medium of claim 9, wherein the machine executable code further causes the machine to:

notify the first node by the second node to delete mirrored lock state information for the data containers in the list; and transfer lock metadata with lock state information for the deleted mirrored lock state information to the first node from the second node.

11. The storage medium of claim 10, wherein the machine executable code further causes the machine to:

recreate deleted mirrored lock state at the first node based on the transferred lock metadata.

12. The storage medium of claim 8, wherein the second node identifies a storage aggregate and a plurality of data container locks for relocation to the first node, and creates a local mirrored lock data structure at a memory of the second node with lock state information for the plurality of data container locks.

13. The storage medium of claim 12, wherein the second node relocates the storage aggregate to the first node with lock state information for the data container locks.

14. The storage medium of claim 13, wherein the first node reconstructs the plurality of data container locks using the relocated lock state information and continues the NDO of the storage system.

15. A system comprising: a memory containing machine readable medium comprising machine executable code having stored thereon instructions; and a processor coupled to the memory to execute the machine executable code to:

transmit a lock synchronization request by a first node of a storage system to a second node operating as a high-availability partner node for non-disruptive operation (NDO) of the storage system in servicing client requests, where the second node takes over client requests for the first node upon the first node becoming unavailable due to an event, and when the first node becomes available, the second node returns control back to the first node for processing the client requests for the first node;

wherein the first node stores lock information for a first lock issued by the first node at a first lock data structure at the first node and mirrors at a first mirrored lock data structure, second lock state information of a second lock issued by the second node, and the second node stores second lock information for the second lock at a second lock data structure and mirrors first lock state information of the first lock at a second mirrored lock data structure;

receive at the first node, in response to the lock synchronization request, metadata with lock state information for a number of locks determined by the second node to meet a threshold value, the threshold value determined by the second node by tracking sequence numbers for locks waiting to be synchronized at any given time; and utilize the received metadata to reconstruct the first lock issued by the first node at the first lock data structure, prior to the first node becoming unavailable due to the event; and utilize the received metadata for synchronizing the second lock state information at the first mirrored lock data structure, the second lock state information includes a reconnect key associated with an exclusive lock for a data container to allow a client to obtain the exclusive lock from the second node after the first node becomes unavailable.

16. The system of claim 15, the machine executable code further causes to:

identify by the second node an out-of-sync lock for the data container; and insert an auto-sync entry in a global auto-sync list having a list of data containers that require resynchronization.

17. The system of claim 16, the machine executable code further causes to:

notify the first node by the second node to delete mirrored lock state information for the data containers in the list; and transfer lock metadata with lock state information for the deleted mirrored lock state information to the first node from the second node.

18. The system of claim 17, the machine executable code further causes to:

recreate deleted mirrored lock state at the first node based on the transferred lock metadata.

19. The system of claim 15, wherein the second node identifies a storage aggregate and a plurality of data container locks for relocation to the first node, and creates a local mirrored lock data structure at a memory of the second node with lock state information for the plurality of data container locks.

20. The system of claim 19, wherein the second node relocates the storage aggregate to the first node with lock state information for the data container locks.

* * * * *